(12) United States Patent
Markus et al.

(10) Patent No.: US 11,494,125 B2
(45) Date of Patent: Nov. 8, 2022

(54) STORAGE SYSTEM AND METHOD FOR DUAL FAST RELEASE AND SLOW RELEASE RESPONSES

(71) Applicant: Western Digital Technologies, Inc., San Jose, CA (US)

(72) Inventors: Yoav Markus, Tel Aviv (IL); Nir Perry, Hod Hasharon (IL); Meytal Soffer, Maale' Hagalil (IL); Alex Lemberg, Kfar Saba (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/179,987

(22) Filed: Feb. 19, 2021

(65) Prior Publication Data

US 2022/0197557 A1 Jun. 23, 2022

Related U.S. Application Data

(60) Provisional application No. 63/126,867, filed on Dec. 17, 2020.

(51) Int. Cl.
*G06F 3/06* (2006.01)

(52) U.S. Cl.
CPC .......... *G06F 3/0659* (2013.01); *G06F 3/0611* (2013.01); *G06F 3/0619* (2013.01); *G06F 3/0656* (2013.01); *G06F 3/0683* (2013.01)

(58) Field of Classification Search
CPC .... G06F 3/0659; G06F 3/0611; G06F 3/0619; G06F 3/0656; G06F 3/0683
See application file for complete search history.

(56) References Cited

U.S. PATENT DOCUMENTS

| | | | |
|---|---|---|---|
| 7,231,497 B2 | 6/2007 | Trika et al. | |
| 7,472,230 B2 | 12/2008 | Prabhu | |
| 8,195,891 B2 | 6/2012 | Trika | |
| 8,990,493 B1 | 3/2015 | Yu et al. | |
| 9,354,979 B2 * | 5/2016 | Fiske | G06F 11/1448 |
| 2004/0199808 A1 * | 10/2004 | Freimuth | H04B 1/74 |
| | | | 714/4.11 |

(Continued)

OTHER PUBLICATIONS

"Universal Flash Storage"; Wikipedia entry; downloaded from the Internet at https://en.wikipedia.org/wiki/Universal_Flash_Storage on Feb. 18, 2021; 4 pages.

*Primary Examiner* — Ramon A. Mercado
(74) *Attorney, Agent, or Firm* — Crowell & Moring LLP

(57) ABSTRACT

A storage system and method for dual fast release and slow release responses are provided. In one embodiment, a storage system is provided comprising a volatile memory, a non-volatile memory, and a controller. The controller is configured to receive, from a host, a write command and data to be written in the non-volatile memory. The host comprises a command queue storing an identifier for the write command and a buffer storing a copy of the data. In response to storing the data in the volatile memory, the controller is configured to instruct the host to remove the identifier for the write command from the host's command queue. In response to successfully writing the data in the non-volatile memory, the controller is configured to instruct the host to remove the copy of the data from the host's buffer. Other embodiments are provided.

18 Claims, 9 Drawing Sheets

(56) References Cited

U.S. PATENT DOCUMENTS

| | | | |
|---|---|---|---|
| 2011/0107347 A1* | 5/2011 | Raisch | H04L 69/329 |
| | | | 719/313 |
| 2016/0283385 A1 | 9/2016 | Boyd et al. | |
| 2017/0123991 A1* | 5/2017 | Sela | G06F 12/0246 |
| 2018/0260115 A1* | 9/2018 | Hara | G06F 3/0676 |

* cited by examiner

STORAGE SYSTEM AND METHOD FOR DUAL FAST RELEASE AND SLOW RELEASE RESPONSES

CROSS-REFERENCE TO RELATED APPLICATION

This application claims the benefit of U.S. provisional patent application No. 63/126,867, filed Dec. 17, 2020, which is hereby incorporated by reference.

BACKGROUND

A host can store data in and retrieve data from a non-volatile memory in a storage system. In a typical write operation, the host sends a write command with data to the storage system, and the storage system attempts to write the data in its non-volatile memory. The storage system can keep a copy of the data in its volatile memory. That way, if there is a power interruption or write failure when writing the data in the non-volatile memory, the storage system can reattempt the write operation.

DETAILED DESCRIPTION

Overview

Figure 1A:
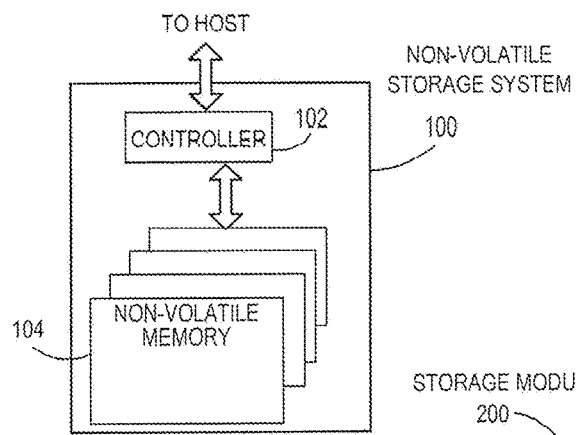
FIG. 1A is a block diagram of a non-volatile storage system of an embodiment.

By way of introduction, the below embodiments relate to a storage system and method for dual fast release and slow release responses. In one embodiment, a storage system is provided comprising a volatile memory, a non-volatile memory, and a controller. The controller is configured to receive, from a host, a write command and data to be written in the non-volatile memory, wherein the host comprises a command queue storing an identifier for the write command and a buffer storing a copy of the data; in response to storing the data in the volatile memory, instruct the host to remove the identifier for the write command from the host's command queue; and in response to successfully writing the data in the non-volatile memory, instruct the host to remove the copy of the data from the host's buffer.

In some embodiments, the controller is further configured to: in response to an unsuccessful attempt to write the data in the non-volatile memory, send a request to the host for the copy of the data.

In some embodiments, the unsuccessful attempt is caused by a power interruption to the non-volatile memory.

In some embodiments, the unsuccessful attempt is caused by a write error.

In some embodiments, the storage system is configured to be embedded in the host.

In some embodiments, the storage system is configured to be removably connected to the host.

In some embodiments, the volatile memory is in the controller.

In some embodiments, the non-volatile memory comprises a three-dimensional memory.

In another embodiment, a method is provided that is performed in a host in communication with a storage system, wherein the host comprises a command queue and a buffer. The method comprises storing an identifier for a write command in the command queue; storing data for the write command in the buffer; sending the write command and the data to the storage system; receiving an instruction from the storage system to remove the identifier for the write command from the command queue; and receiving an instruction from the storage system to remove the data from the buffer.

In some embodiments, the method further comprises receiving a request for the data from the storage system; and in response to the request, sending the data to the storage system.

In some embodiments, the request is received in response to an unsuccessful attempt to write the data in the storage system.

In some embodiments, the unsuccessful attempt is caused by a power interruption in the storage system.

In some embodiments, the unsuccessful attempt is caused by a write error.

In some embodiments, the method further comprises using a kernel in the host to remove the identifier from the host's command queue.

In some embodiments, the method further comprises using a kernel in the host to remove the data from the host's buffer.

In another embodiment, a storage system is provided comprising a non-volatile memory; means for receiving, from a host, a write command and data to be written in the non-volatile memory; and means for instructing the host to remove an identifier for the write command from the host's command queue before instructing the host to remove a copy of the data from the host's buffer.

In some embodiments, the storage system further comprises volatile memory, wherein the host is instructed to remove the identifier in response to the data being stored in the volatile memory.

In some embodiments, the host is instructed to remove the copy of the data in response to the data being successfully stored in the non-volatile memory.

In some embodiments, the storage system is configured to be embedded in the host.

In some embodiments, the storage system is configured to be removably connected to the host.

Other embodiments are possible, and each of the embodiments can be used alone or together in combination. Accordingly, various embodiments will now be described with reference to the attached drawings.

Embodiments

Figure 1B:
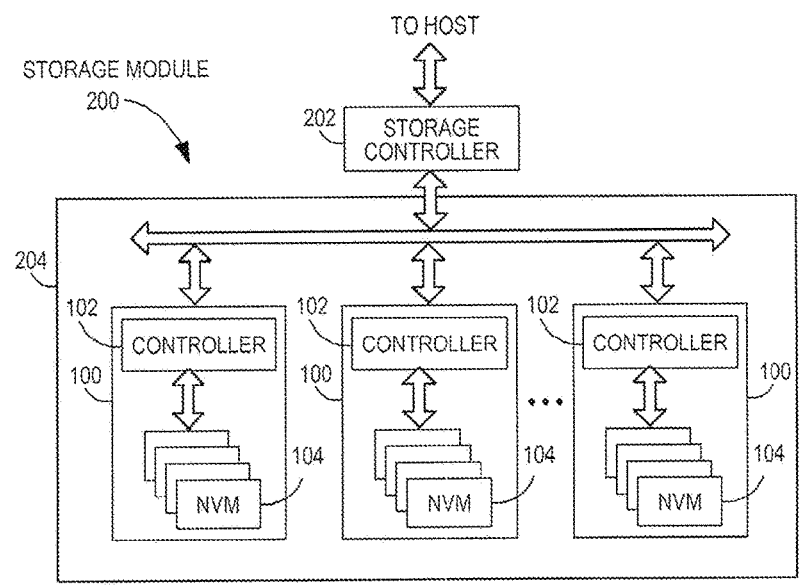
FIG. 1B is a block diagram illustrating a storage module of an embodiment.
Figure 1C:
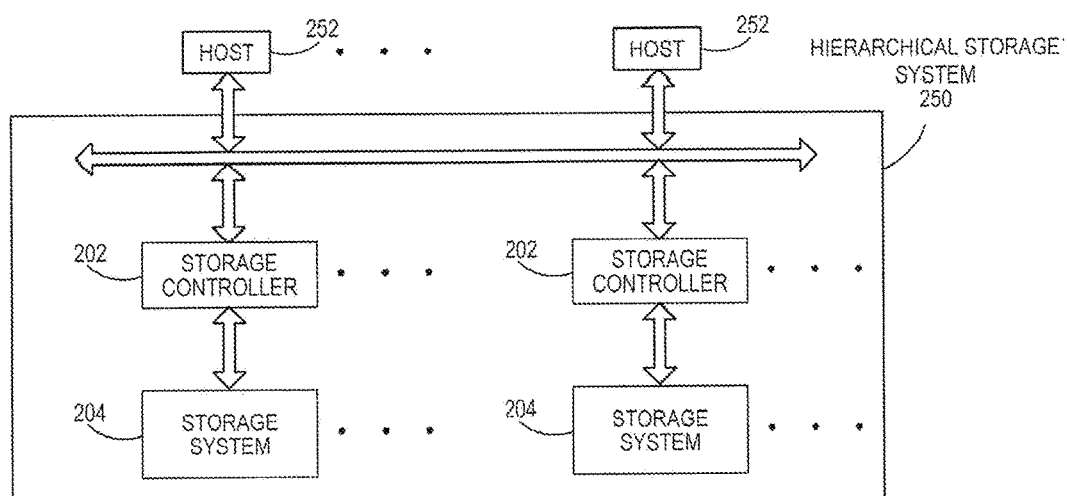
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
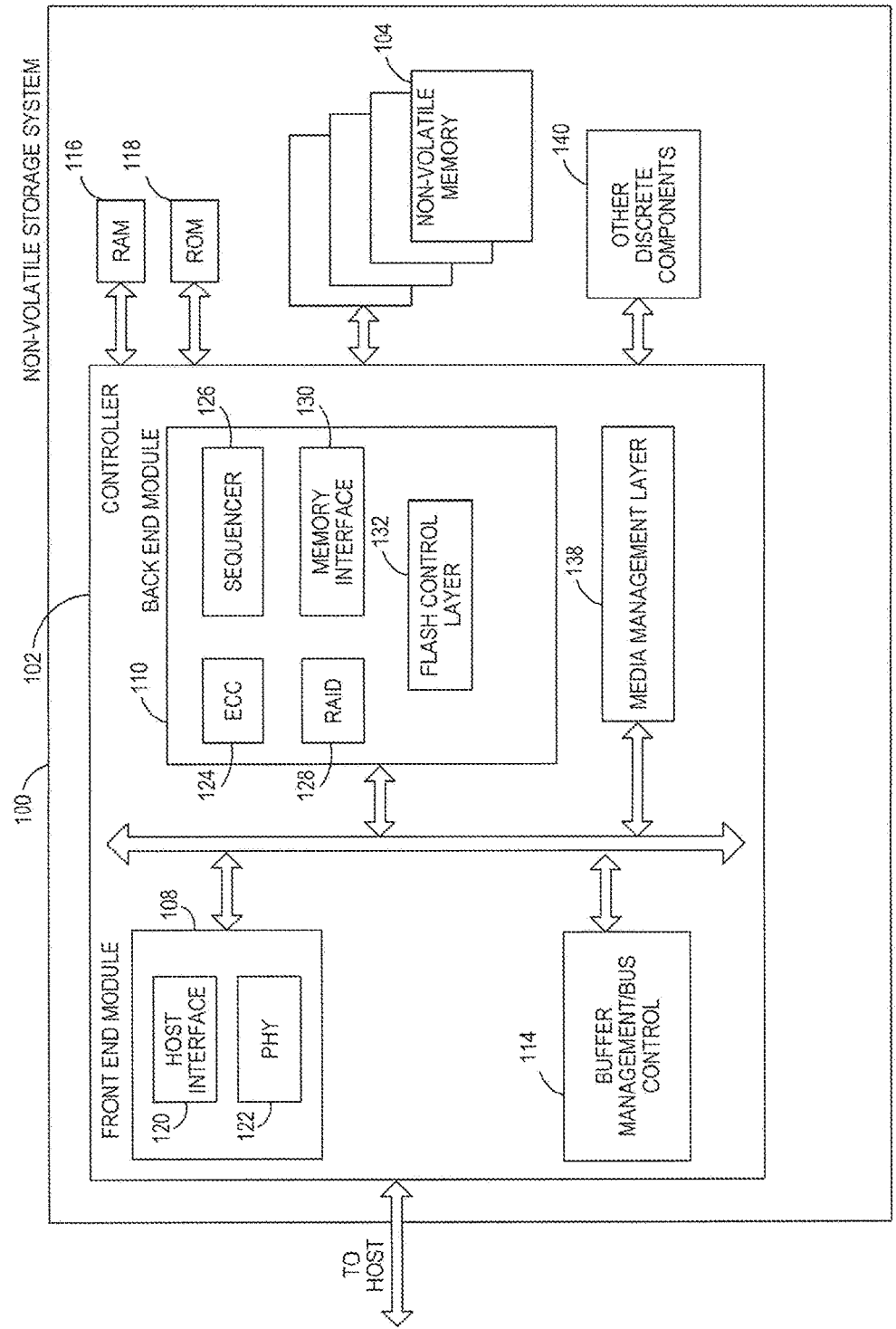
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
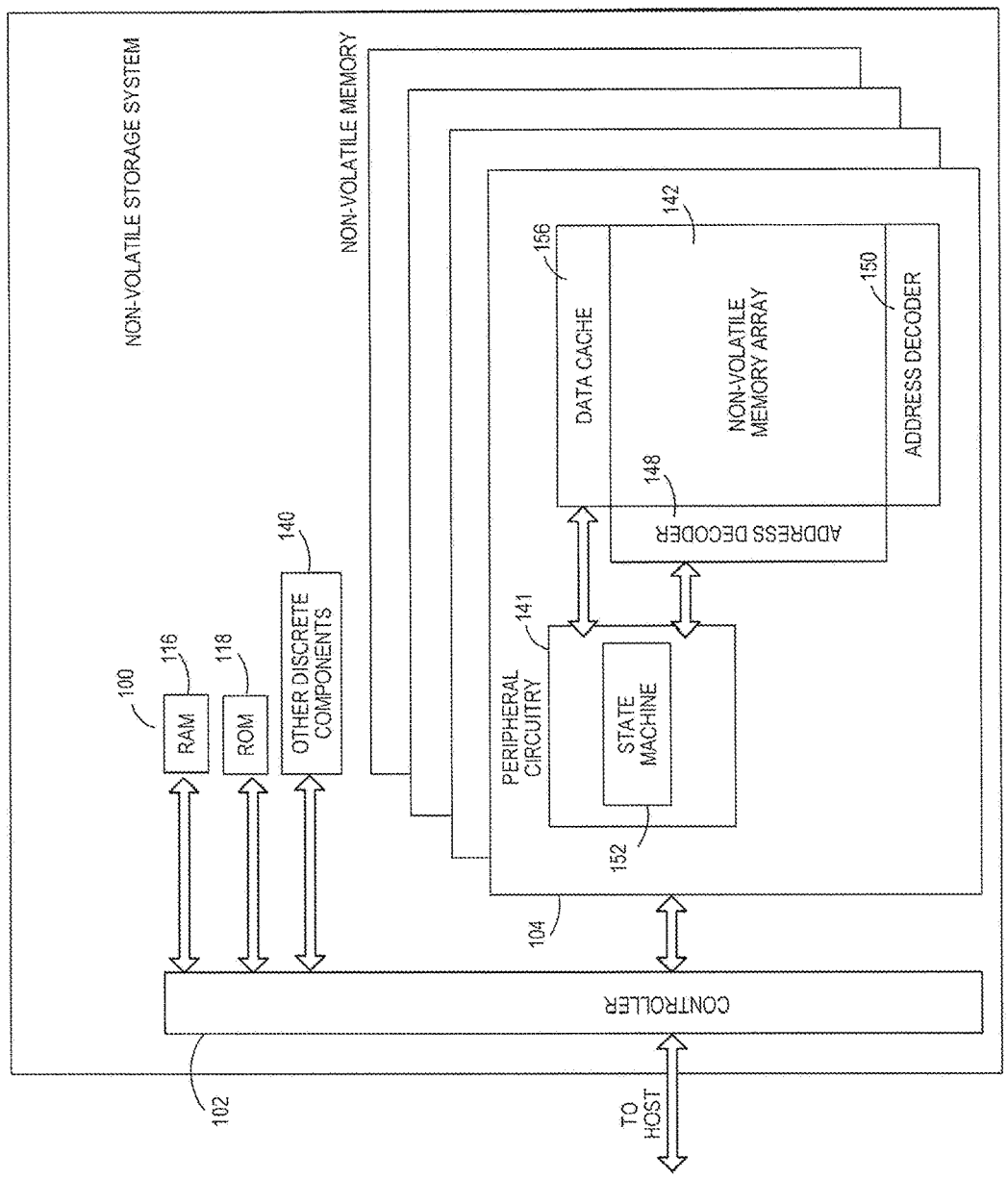
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
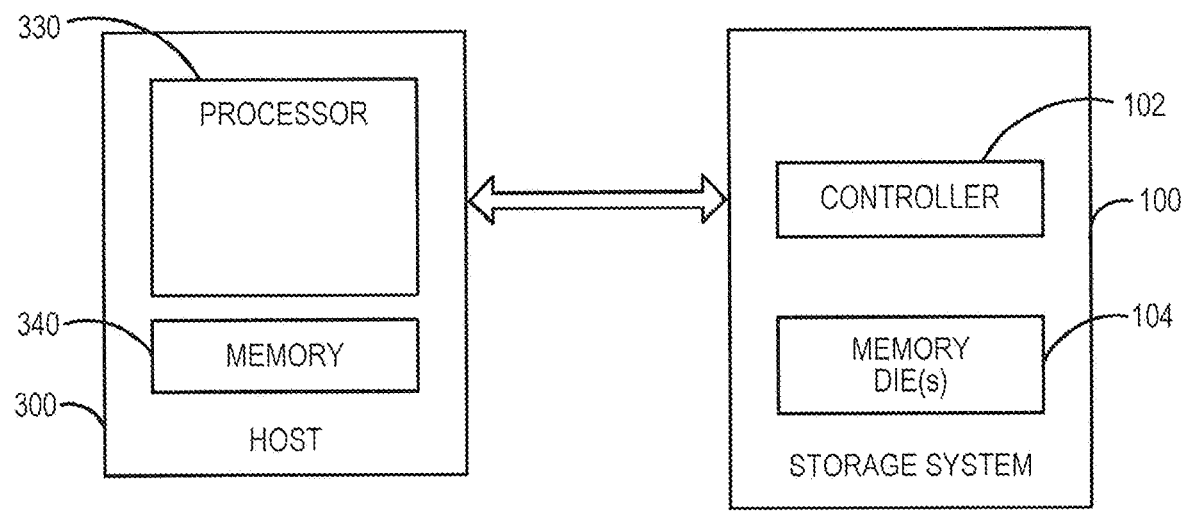
FIG. 3 is a block diagram of a host and storage system of an embodiment.

Turning again to the drawings, FIG. 3 is a block diagram of a host 300 and storage system 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300.

Figure 4:
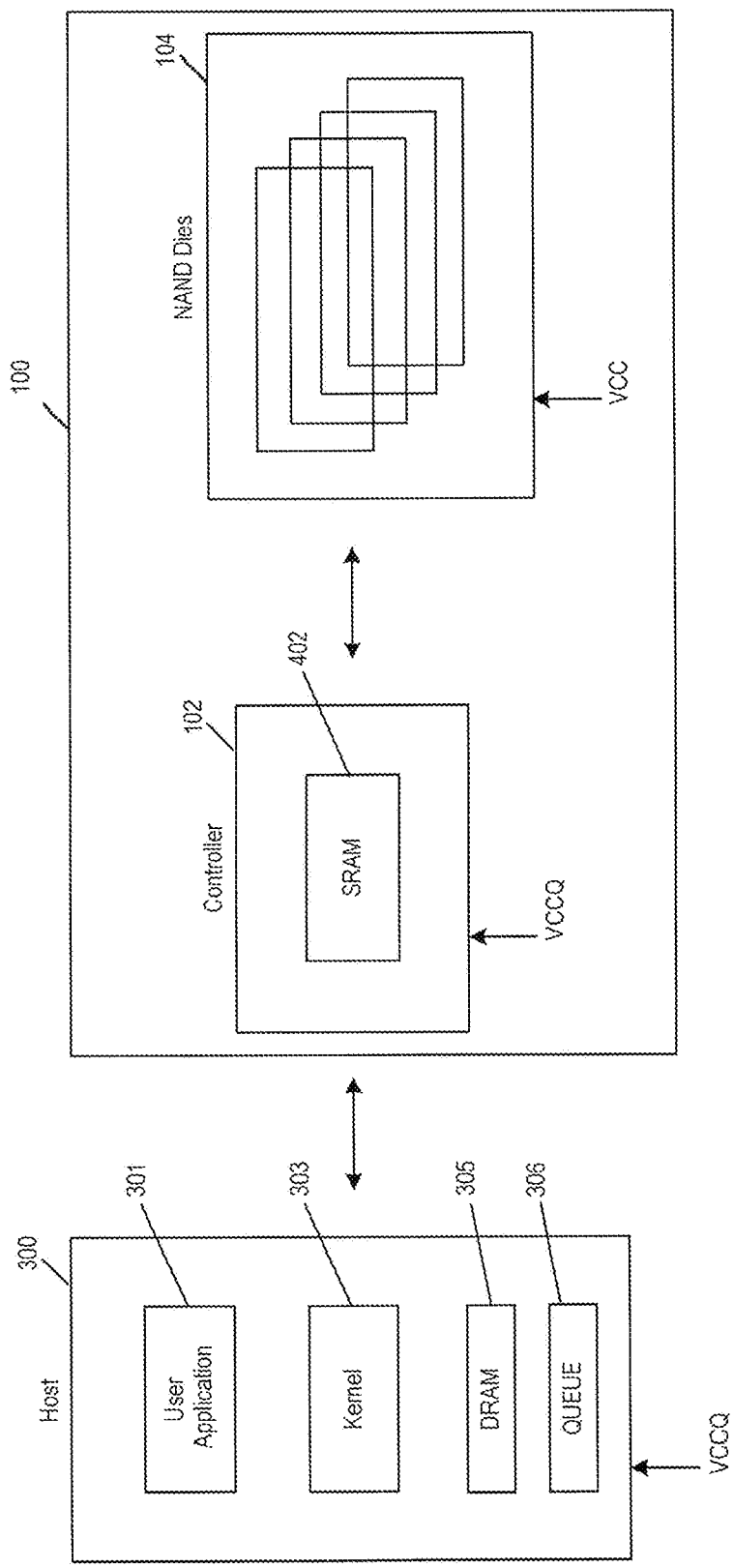
FIG. 4 is another block diagram of a host and storage system of an embodiment.

In embedded storage systems (i.e., storage systems that are embedded in a host), there are typically two separate power supplies, VCC and VCCQ. VCC provides power to the storage system's memory (e.g., NAND flash dies), and VCCQ provides power to the storage system's controller (e.g., ASIC). The host is also usually powered by the same VCCQ supply. FIG. 4 is a block diagram that illustrates this power distribution to the storage system 100 and host 300 (which, here, comprises a user application 301, kernel/processor 303, DRAM 305, and a command queue 306) of this embodiment. By way of example only, in one implementation, VCC can be 2.5 or 3.3 volts, and VCCQ can be 1.2 or 1.8 volts. Of course, these are merely examples, and other values can be used. Also, in one embodiment, VCC and VCCQ are provided by a battery or other power source of the host 300.

During a write operation, the host 300 sends data to the storage system 100 for storage in its non-volatile memory 104. In this embodiment, the data received from the host 300 is stored in SRAM 402 (or other volatile memory) in the controller 102. However, the SRAM 402 or other volatile memory can be located external to the controller 102. Accordingly, when it is said that data is stored in the volatile memory in the storage system 100, this can mean that the data is stored in volatile memory in the controller 102 or in volatile memory outside of the controller 102 (but still in the storage system 100).

It is possible for the power (VCC) supplied to the memory 104 to fail or become unstable for a period of time prior to the data being successfully written to the memory 104. Either situation will be referred to herein as a power interruption. A similar problem can occur if there is a write failure in programming the data in the memory 104. To prevent data loss in either situation, the data can be retained in volatile memory in the storage system (e.g., in the controller's SRAM buffer 402 or in volatile memory outside of the controller 102) until the data has been successfully written in the memory 104. That way, if a power interruption to the memory 104 occurs prior to the data being successfully written in the memory 104, the storage system 100 would still have a copy of the data and can reattempt writing the data in the memory 104. After the data has been successfully written in the memory 104, the data can be released from the controller's SRAM buffer 402.

However, in high-data-throughput environments that require a large NAND page size and a large number of dies programmed concurrently, the controller's SRAM buffer 402 may not be sufficiently large to hold the data for this extended period of time. For example, with a page size of 200 kilobytes (KB) and eight dies programmed concurrently, the size of the SRAM buffer 402 needed just to protect this data would be 1,600 KB. Adding more SRAM to the storage system 100 may be prohibitively expensive.

Another option is to keep the data stored in the host's buffer 305 instead of the controller's buffer 402. However, in many hosts, keeping the data from a write operation stored in the host's buffer 305 also requires keeping the task identifier (ID) for the write operation in the host's command queue 306. This can be problematic because it can slow performance of the host 300, especially when the queue depth is limited (e.g., a queue depth of 32).

Under the current Universal Flash Storage (UFS) specification, hosts use a "write back cache" mode, in which a storage system sends a response immediately after all data of the command was sent by the host. Only special commands (e.g., write commands marked with force unit access (FUA)) have their responses sent after the data is securely stored in the non-volatile storage. In such cases, the task ID is kept until the completion response.

The following embodiments can be used to allow the host's buffer 305 to store the data until successfully programmed in the memory 104. In one embodiment, after the host's user application 301 writes user data to the storage system 100, the host's kernel 303 allocates both a buffer identifier (ID) and a task ID for the write command. In general, these embodiments bi-furcate the release of the task ID from the host's command queue 306 from the release of the data from the host's buffer 305. This is referred to herein as a dual fast release (releasing the task ID) and slow release (the buffer release) response system. These embodiments allow the data to still be retained in the host's buffer 305 (in case it is needed due to a write failure in the storage system 100) without retaining the task ID in the host's command queue 306. To do this, instead of using a single instruction to the host 300 to release both the task ID from the host's command queue 306 and the data from the host's buffer 305 once the data is stored in the storage system's buffer 402, the storage system 100 sends two instructions, as illustrated in FIG. 5.

Figure 5:
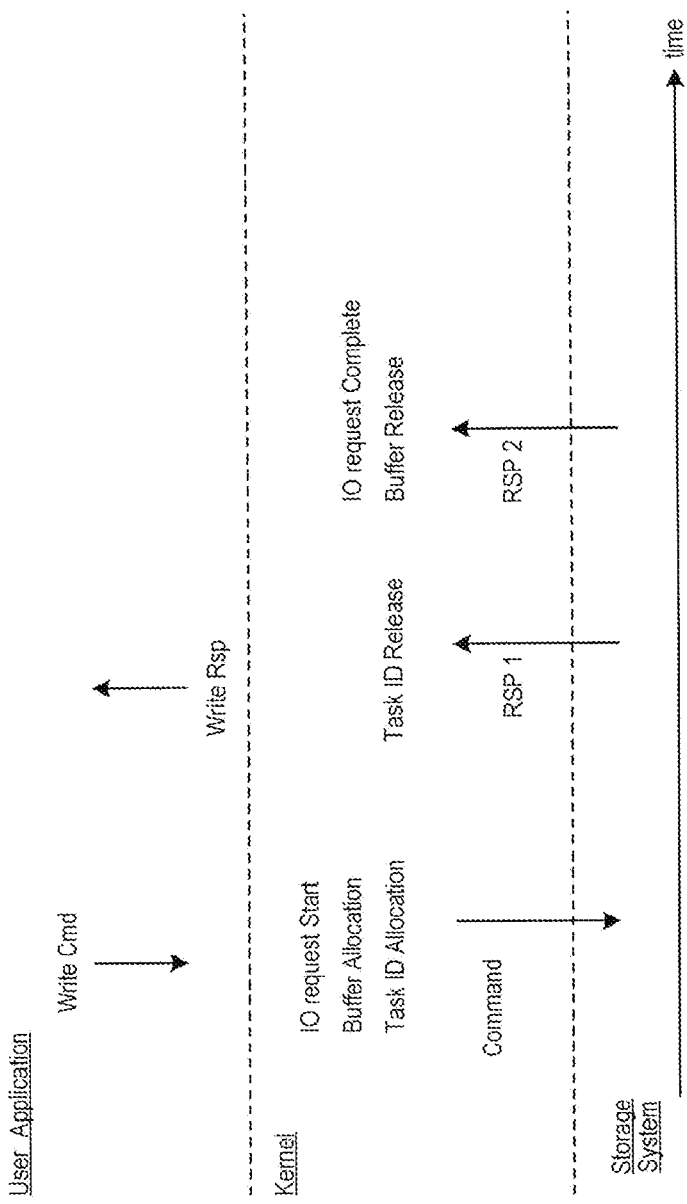
FIG. 5 is a timeline of an asynchronous write operation of an embodiment.

As shown in FIG. 5, the storage system 100 sends an instruction (response (RSP) 1) to the host 300 once the data is stored in the storage system's buffer 402 to release the task ID from the host's command queue 306. This is considered the fast response. However, the data is still also stored in the host's buffer 305 as a backup, if needed. But because the task ID is released from the host's command queue 306, a task ID of another command can be placed in the host's command queue 306, thereby avoiding the reduction in performance noted above.

Even though the task ID for the write command is no longer in the host's command queue 306, the data of the write command is still in the host's buffer 305. That way, if there is a power interruption, write failure, or other problem, the storage system 100 can request the data to reattempt the write operation.

Once the data has been successfully written to the memory 104, the storage system 100 sends an instruction (response (RSP) 2) to the host 300 to release the backup copy of the data from the host's buffer 305. This is considered the slow response because it is sent after the first response.

Figure 6:
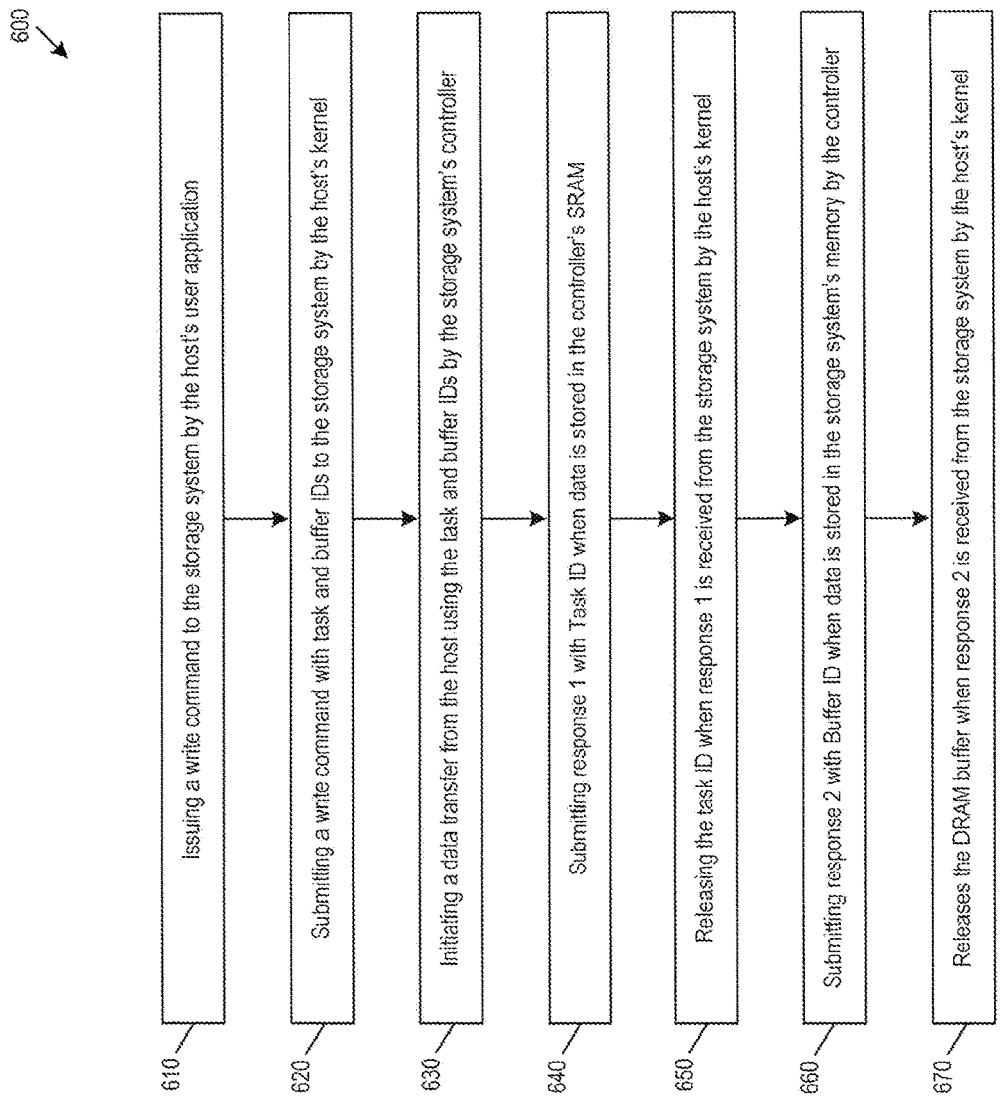
FIG. 6 is a flow chart of a method of an embodiment for separately releasing a task identifier from a host's command queue and data from a host's buffer.

This process is illustrated in the flow chart 600 in FIG. 6. As shown in FIG. 6, the host's user application 301 issues a write command to the storage system 100 (act 610). The host's kernel 303 then submits the write command with task and buffer IDs to the storage system 100 (act 620). The controller 102 then initiates a data transfer from the host 300 using the task and buffer IDs (act 630). Then, the controller 102 submits response 1 with the task ID when the data is stored in the controller's SRAM 402 (act 640). After that, the host's kernel 303 releases the task ID when it receives response 1 (act 650). The controller 102 then submits response 2 with the buffer ID with the data has been successfully stored in the memory 104 (act 660). The host's kernel 303 then release the DRAM buffer 305 when it receives response 2.

Figure 7:
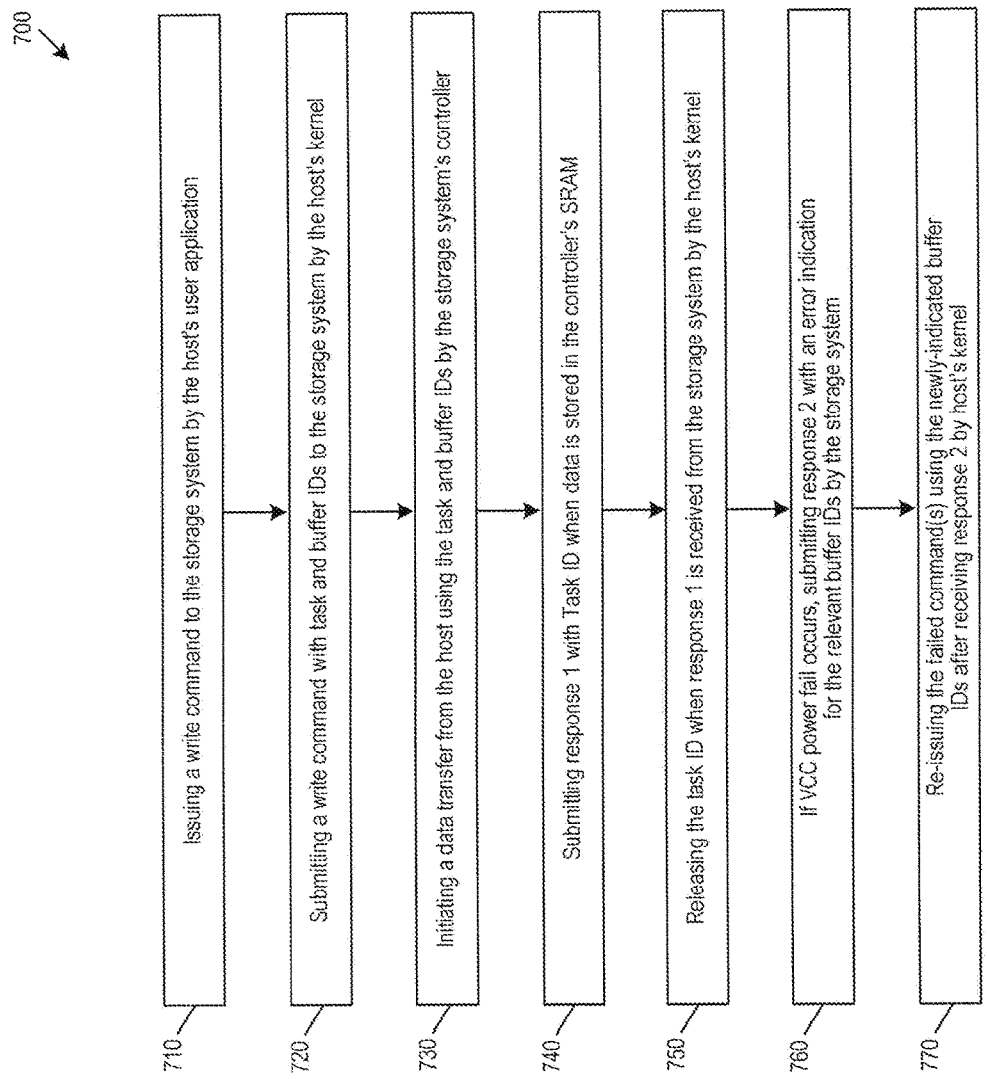
FIG. 7 is a flow chart of a method of an embodiment for handling a power failure that results in unsuccessful programming of data in a storage system's non-volatile memory.

FIG. 7 is a flow chart 700 of a method of an embodiment for handling a power interruption that results in unsuccessful programming of data in a storage system's memory 104. In this example, a VCC power interruption causes all memory dies to lose their power supply temporarily. The controller 102 can be configured to send response 2 (RSP 2) with a failure indication for the affected commands, so the host's kernel 303 can reissue the commands with new task IDs for all relevant buffer IDs stored in the host's DRAM 305.

As shown in FIG. 7, the host's user application 301 issues a write command to the storage system 100 (act 710). The host's kernel 303 then submits the write command with task and buffer IDs to the storage system 100 (act 720). The controller 102 then initiates a data transfer from the host 300 using the task and buffer IDs (act 730). Then, the controller 102 submits response 1 with the task ID when the data is stored in the controller's SRAM 402 (act 740). After that, the host's kernel 303 releases the task ID when it receives response 1 (act 750). If a VCC power failure occurs at this point, the storage system 100 submits response 2 with an error indication for the relevant buffer IDs (act 760). After receiving response 2, the host's kernel 303 then reissues the failed command(s) using the old buffer IDs with newly-allocated task IDs (act 770).

Figure 8:
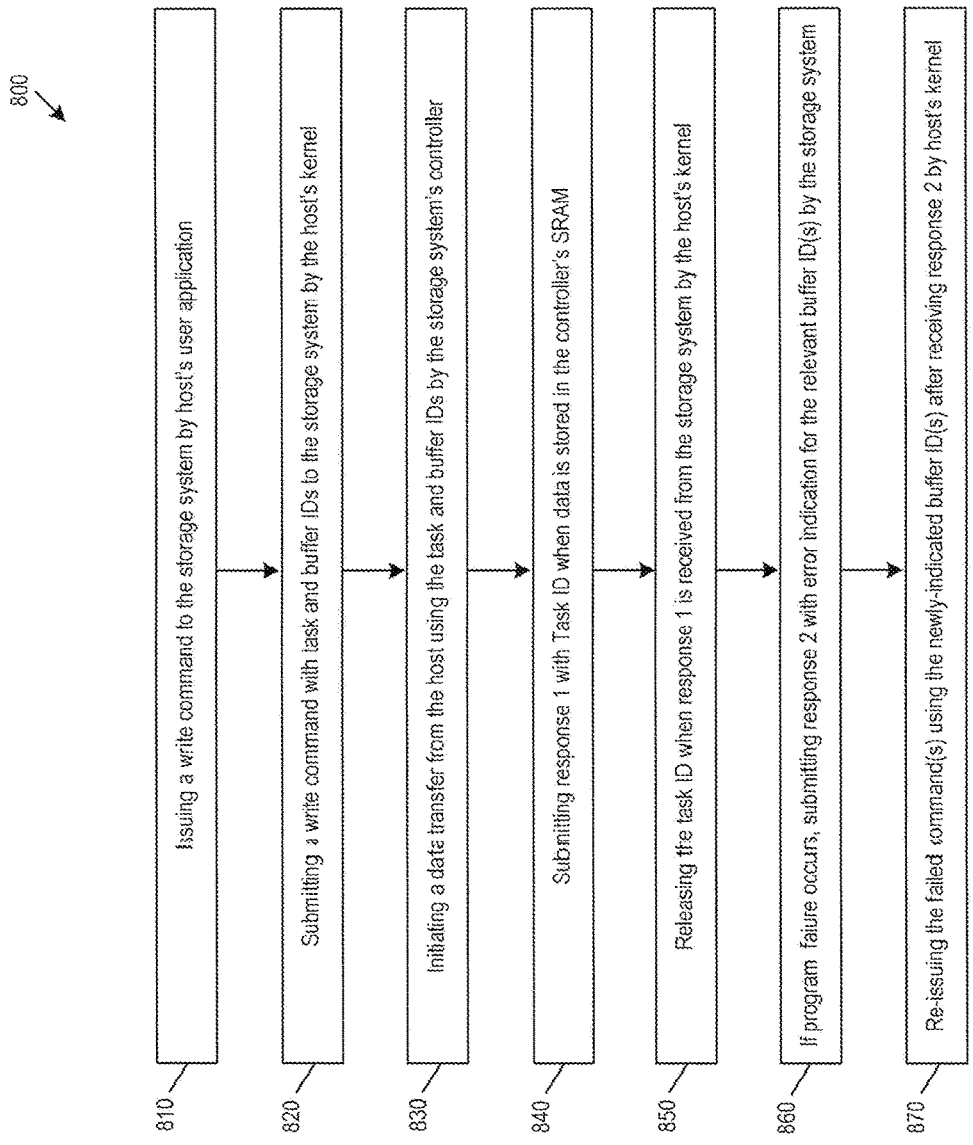
FIG. 8 is a flow chart of a method of an embodiment for handling a program failure that results in unsuccessful programming of data in a storage system's non-volatile memory.

FIG. 8 is a flow chart 800 of a method of an embodiment for handling a program failure that results in unsuccessful programming of data in a storage system's memory 104. In this example, a program failure occurs on a single die in the memory 104. The controller 102 is configured to send response 2 (RSP 2) with a failure indication only for the commands that were part of the failed programmed NAND page. The host 300 can reissue the command for the relevant buffer ID stored in the host's DRAM 305.

As shown in FIG. 8, the host's user application 301 issues a write command to the storage system 100 (act 810). The host's kernel 303 then submits the write command with task and buffer IDs to the storage system 100 (act 820). The controller 102 then initiates a data transfer from the host 300 using the task and buffer IDs (act 830). Then, the controller 102 submits response 1 with the task ID when the data is stored in the controller's SRAM 402 (act 840). After that, the host's kernel 303 releases the task ID when it receives response 1 (act 850). If a program failure occurs at this point, the storage system 100 submits response 2 with an error indication for the relevant buffer IDs (act 860). After receiving response 2, the host's kernel 303 then reissues the failed command(s) using the old buffer IDs with the newly-allocated task IDs (act 870).

There are several advantages associated with these embodiments. For example, these embodiments can allow more-reliable operation for limited SRAM storage systems, where the host stores a copy of the user data in its DRAM and release the data only when the data is stored in the storage system's non-volatile memory (after RSP 2). At the same time, the host is not slowed down and gets a fast RSP 1 that allows it to release the task ID and utilize the queue depth more efficiently. The dual response system in these embodiments also provides improved performance and reliability and allows working with higher parallel architectures (e.g., 16, 32, 64, or 128 flash dies) since the bottleneck of concurrently storing user data in the storage system is removed. This can be especially advantageous with storage systems that have low-resource controllers with small SRAMs. These embodiments also can improve overall performance by making usage of force unit access (FUA) (cache off) and flash sync commands less frequently since user data is safely stored in the host's DRAM and can be re-accessed in case of a program failure or (partial or complete) VCC power loss. So, these embodiments allow the storage system to support higher throughput with less resources and support future higher parallelism devices (required to support higher throughputs) without increasing device resources.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
   a volatile memory;
   a non-volatile memory; and
   a controller configured to:
      receive, from a host, a write command, data to be written in the non-volatile memory, and a buffer identifier identifying a buffer location in the host that stores a copy of the data;
      in response to receiving the write command and the data, store the data in the volatile memory;
      in response to storing the data in the volatile memory but prior to successfully writing the data in the non-volatile memory, instruct the host to remove an identifier for the write command from a command queue in the host, which enables the host to store an identifier for another write command in the command queue, wherein the copy of the data is still stored in the buffer location after the identifier for the write command has been removed from the command queue;
      attempt to write the data in the non-volatile memory;
      in response to successfully writing the data in the non-volatile memory, send a success message with the buffer identifier to instruct the host to remove the copy of the data from the host's buffer; and
      in response to not successfully writing the data in the non-volatile memory, send a failure message with the buffer identifier to instruct the host to re-issue the write command.

2. The storage system of claim 1, wherein the data is not successfully written to the non-volatile memory due to a power interruption to the non-volatile memory.

3. The storage system of claim 1, wherein the data is not successfully written to the non-volatile memory due to a write error.

4. The storage system of claim 1, wherein the storage system is configured to be embedded in the host.

5. The storage system of claim 1, wherein the storage system is configured to be removably connected to the host.

6. The storage system of claim 1, wherein the volatile memory is in the controller.

7. The storage system of claim 1, wherein the non-volatile memory comprises a three-dimensional memory.

8. A method comprising:
   performing the following in a host in communication with a storage system comprising volatile and non-volatile memory, wherein the host comprises a command queue and a buffer:
      storing an identifier for a write command in the command queue;
      storing data for the write command in the buffer, wherein a buffer identifier identifies a location in the buffer that stores the data;
      sending the write command, the buffer identifier, and the data to the storage system;
      receiving an instruction from the storage system to remove the identifier for the write command from the command queue in response to the data being stored in the volatile memory but not yet stored in the non-volatile memory;
      removing the identifier for the write command from the command queue, wherein the data is still stored in the buffer after the identifier for the write command has been removed from the command queue;
      storing an identifier for another write command in the command queue; and
      receiving an instruction with the buffer identifier from the storage system to either remove the data from the buffer or reissue the write command.

9. The method of claim 8, wherein the instruction is received in response to an unsuccessful attempt to write the data in the storage system.

10. The method of claim 9, wherein the unsuccessful attempt is caused by a power interruption in the storage system.

11. The method of claim 9, wherein the unsuccessful attempt is caused by a write error.

12. The method of claim 8, further comprising using a kernel in the host to remove the identifier from the host's command queue.

13. The method of claim 8, further comprising using a kernel in the host to remove the data from the host's buffer.

14. The method of claim 8, wherein the storage system is embedded in the host.

15. The method of claim 8, wherein the storage system is removably connected to the host.

16. The method of claim 8, wherein the storage system comprises a three-dimensional memory.

17. The method of claim 8, wherein the host comprises a mobile device.

18. A storage system comprising:
- a volatile memory;
- a non-volatile memory;
- means for receiving, from a host, a write command, data to be written in the non-volatile memory, and a buffer identifier identifying a buffer location in the host that stores a copy of the data;
- means for storing the data in the volatile memory in response to receiving the write command and the data;
- means for instructing the host, in response to storing the data in the volatile memory but prior to successfully writing the data in the non-volatile memory, to remove an identifier for the write command from a command queue in the host, which enables the host to store an identifier for another write command in the command queue, wherein the copy of the data is still stored in the buffer location after the identifier for the write command has been removed from the command queue;
- means for attempting to write the data in the non-volatile memory;
- means for sending a success message with the buffer identifier to instruct the host to remove the copy of the data from the host's buffer in response to successfully writing the data in the non-volatile memory; and
- means for sending a failure message with the buffer identifier to instruct the host to re-issue the write command in response to not successfully writing the data in the non-volatile memory.

\* \* \* \* \*